2,948,621

PROCESS OF MANUFACTURING NUT FLAVORING ADDITIVES

Fitzhugh L. Avera, Alameda, Calif., assignor to Corn Products Company, a corporation of Delaware No Drawing. Original application July 19, 1954, Ser. No. 444,395, now Patent No. 2,859,121, dated Nov. 4, 1958. Divided and this application July 14, 1958, Ser. No. 748,182

7 Claims. (Cl. 99—128)

The invention, in general, relates to the art of food flavorings and more particularly relates to the manufacture of nut flavorings which, per se, are useful as condiments or spreads and which are especially useful in foods containing moisture or foods residing in an aqueous environment for enhancing and maintaining the taste characteristics thereof.

This application is a division of my copending application, Serial No. 444,395, filed July 19, 1954, now Patent No. 2,859,121, and entitled "Process of Manufacturing Nut Flavoring Additives and Coated Nuts."

Wherever reference is made herein to nuts and nut bearing products, such term is intended to include peanuts, almonds, walnuts, filberts, pecans, cashew nuts, ice creams, condiments, baked goods or other comestibles containing any one or combination of the specified nuts. However, for brevity and purposes of explanation solely, the process of my invention is described herein in environments wherein peanuts or peanut butter is used.

As is perhaps well known, undesirable odors and flavors often develop in the manufacture of nut products and nut bearing products. Moreover, when such products are employed in aqueous bearing media or when they are exposed to water or water vapor, undesirable browning of the end products often occurs and this inhibits the sale or use of such end products. Sometimes, a change in the physical state of nut products will occur which suggests coagulation. The present invention is directed to a process of providing nut flavoring additives which, when combined with comestibles residing in an aqueous environment or exposed to water or water vapor, inhibits the development of noxious odors and flavors in the combination and which obviates undesirable browning thereof.

A primary object of my invention is to provide an improved process of manufacturing nut flavoring additives which enhances the taste characteristics and palatability of foods in which they are introduced, and which reduces the likelihood of the development of undesirable taste and noxious odors of standing foods.

Another important object of my invention is to provide an improved process of manufacturing nut flavoring additives of the indicated nature which is additionally characterized by the assimilability of such nut flavoring additives by foods residing in an aqueous environment and which maintain their taste characteristics after introduction thereof into other comestibles, without detracting from the over-all flavor, taste and appearance of the particular food with which the additives have been combined.

A still further object of the present invention is to provide a process of manufacturing nut flavoring additives for introduction into foods of all types to afford end products which are resistant to browning reaction and to the development of undesirable flavors and odors as well as to apparent coagulation in the presence of an aqueous or water bearing media, or in the presence of water per se or water vapor.

Other objects of the invention, together with some of the advantageous features thereof, will appear from the following description of a preferred mode of manufacture as well as certain modified methods of manufacturing the nut flavoring additives of my present invention. It is to be understood, however, that I am not to be limited to the precise modes hereinafter set forth, nor to the precise order of the steps thereof, as the invention, as defined in the appended claims, can be practiced in a plurality and variety of ways.

A preferred embodiment of my present process of manufacturing a nut flavoring additive preferably comprises providing a nut butter and cooling the same to room temperature, providing an aqueous solution of an edible polyhydric alcohol having more than three hydroxyl groups in its composition, cooling said solution to at least room temperature, and then intimately intermixing said nut butter and said aqueous alcohol.

A modified embodiment of my present process of manufacturing a nut flavoring additive preferably comprises comminuting a quantity of roasted, shelled and blanched nuts to provide a homogeneous nut mass and while at the grinding temperature of the nuts intermixing therewith an edible aqueous polyhydric alcohol of the type hereinabove specified which is at a temperature between ambient and the temperature of the ground nuts at the time of introduction thereof into the nut mass.

In accordance with this invention, and particularly with respect to the manufacture of an improved nut flavoring additive having peanut butter as one component thereof, I prepare in the conventional way a quantity of peanut butter from roasted, shelled and blanched peanuts. I also prepare a volume of an approximately 70% aqueous solution of an edible polyhydric alcohol, having more than three hydroxyl groups in its composition, preferably utilizing either commercially available sorbitol or mannitol as the alcohol component of the solution, as each of these substances has more than three hydroxyl groups in its composition. The aforesaid edible polyhyrdic alcohol is then intimately mixed with the nut butter to afford a smooth blend. These two components of my improved nut flavoring additive may be intermixed under any of the conditions set out hereinafter with respect to temperature and proportions of the components.

I have found that an optimum nut flavoring additive of the character described can be manufactured either batch-wise or by continuous processing. In combining the components batch-wise, the prepared nut butter is first cooled to room temperature and thereafter disposed in a suitable mixing vessel in which a requisite amount of an approximately 70% aqueous solution of sorbitol or mannitol has been disposed after first bringing the temperature thereof to room temperature or even slightly below room temperature. As a continuous process, the nut butter may be cooled to room temperature or even slightly below room temperature and continuously metered and mixed with an amount of an approximately 70% aqueous solution of either of the aforesaid edible polyhydric alcohols in an intensive mixing chamber of any suitable design, and the admixture agitated until a smooth blend of the mixed materials is attained. Or, the nut butter component can be utilized while at the grinding temperature of the nuts, and either of the aforesaid edible polyhydric alcohols in crystalline or pellet form, together with a requisite amount of distilled water, both at a temperature between ambient and the aforesaid grinding temperature of the nuts, can be continuously metered and mixed in the vessel containing the nut butter at said grinding temperature of the nuts, employing for the mix any suitable agitating device to afford a smooth blend of the mixed materials.

For industrial manufacture of foods, such as ice cream or other foods including cake mixes residing in an aqueous environment, or containing water or even water vapor, and with which my improved nut flavoring additive is combined, I have found it desirable and advantageous for optimum end products to provide a mix of the aforesaid two components wherein the edible polyhydric alcohol component is present as approximately 50% to 60%, by weight, of the total nut flavoring additive. For example, I have prepared a highly efficacious ice cream in nut flavor, by introducing approximately 20 ounces of my improved nut flavoring additive containing the aforesaid percentage of the edible polyhydric alcohol into approximately 5 gallons of industrially prepared ice cream. This combination was permitted to stand for an appreciable time interval. The end product is a delightfully tasting nut-flavored ice cream free of any acrid or bitter taste, and it is thought that the bond, which occurs between the hydroxyl groups of the aforesaid type of edible polyhydric alcohol and the protein solids of the nut butter and which appears to persist after the addition has been made with the ice cream, inhibits the off or side flavors which otherwise occur where nut containing foods residing in an aqueous environment remain standing for any appreciable period.

The introduction of my improved nut flavoring additive, with the aforesaid components present in the proportions stated, into cake mixes industrially prepared and containing moisture likewise affords end products which are enhanced both in flavor and taste characteristics; the presence of the stated edible polyhydric alcohol inhibiting the development of noxious odors which otherwise might occur because of the existence of an aqueous phase in the moisture-containing end product in the presence of the nut butter component of the additive prior to baking.

My improved nut flavoring additive is also highly efficacious as a condiment or spread, per se, in connection with household prepared foods, such as cakes, cookies and the like as well as plain or toasted slices of bread. As a condiment, such as in icings for cakes or as a spread for bread, the nut flavoring additive of my present invention should be prepared in the manner hereinabove stated except that the edible polyhydric alcohol component of the additive is present in smaller amounts, namely, in the range of from 1% to 10% by weight of the total additive. Such a composition of the additive is highly efficacious in that the texture of the foods to which my additive is added or combined is not impaired in any way, the nut butter component enhances the taste and flavor characteristics of the end products, and there is little likelihood of the occurrence of noxious odors or coagulation between the components of the additive and the food per se, with which it has been combined.

It is to be understood that the appended claims are to be accorded a range of equivalents commensurate in scope with the advance made over the prior art.

I claim:

1. A process of manufacturing a nut flavoring additive, said process comprising the steps of preparing a nut butter, cooling the nut butter to room temperature, and then introducing into the cooled nut butter an approximately 70% aqueous solution of sorbitol.

2. A process of manufacturing a nut flavoring additive, said process comprising the steps of preparing a nut butter, cooling the nut butter to room temperature, and then introducing into the cooled nut butter an approximately 70% aqueous solution of sorbitol to an extent that said sorbitol constitutes between 50% and 60% by weight of the total additive.

3. A process of manufacturing a nut flavoring additive, said process comprising the steps of preparing a nut butter, cooling the nut butter to room temperature, and then introducing into the cooled nut butter an approximately 70% aqueous solution of sorbitol in an amount ranging between 1% to 10% by weight of the total additive.

4. A process of manufacturing a nut flavoring additive, said process comprising the steps of preparing a nut butter, cooling the nut butter to room temperature, and then introducing into the cooled nut butter an approximately 70% aqueous solution of mannitol.

5. A process of manufacturing a nut flavoring additive, said process comprising the steps of preparing a nut butter, cooling the nut butter to room temperature, and then introducing into the cooled nut butter an approximately 70% aqueous solution of mannitol in an amount ranging between 1% to 10% by weight of the total additive.

6. A process of manufacturing a nut flavoring additive, said process comprising the steps of preparing a nut butter, cooling the nut butter to room temperature, and then introducing into the cooled nut butter an approximately 70% aqueous solution of mannitol to an extent that said mannitol constitutes between 50% and 60% by weight of the total additive.

7. A process of manufacturing a food product residing in an aqueous environment, said process comprising the steps of preparing a mass of nut butter, cooling the mass to room temperature, introducing into the cooled mass an approximately 70% aqueous solution of sorbitol to an extent that the sorbitol constitutes between 50% and 60% by weight of the total mass, and then introducing approximately 20 ounces of said mass into approximately 5 gallons of ice cream.

References Cited in the file of this patent

UNITED STATES PATENTS

| | | |
|---|---|---|
| 2,166,806 | Du Puis et al. | July 18, 1939 |
| 2,552,925 | Avera | May 15, 1951 |
| 2,631,104 | Welker | Mar. 10, 1953 |
| 2,859,121 | Avera | Nov. 4, 1958 |

OTHER REFERENCES

"Sorbitol" by Childs, The Manufacturing Confectioner, October 1945, pp. 26 and 28.